United States Patent
Wilson

(10) Patent No.: US 9,496,715 B2
(45) Date of Patent: Nov. 15, 2016

(54) GRID OSCILLATION ANALYSIS METHOD AND APPARATUS THEREFOR

(75) Inventor: Douglas Wilson, Edinburgh (GB)

(73) Assignee: Psymetrix Limited, Edinburgh (GB)

( * ) Notice: Subject to any disclaimer, the term of this patent is extended or adjusted under 35 U.S.C. 154(b) by 993 days.

(21) Appl. No.: 13/505,118

(22) PCT Filed: Nov. 18, 2010

(86) PCT No.: PCT/GB2010/051922
§ 371 (c)(1),
(2), (4) Date: May 31, 2012

(87) PCT Pub. No.: WO2011/061538
PCT Pub. Date: May 26, 2011

(65) Prior Publication Data
US 2012/0232820 A1    Sep. 13, 2012

(30) Foreign Application Priority Data
Nov. 18, 2009  (GB) .................................. 0920206.0

(51) Int. Cl.
*H02J 3/24* (2006.01)

(52) U.S. Cl.
CPC .............. *H02J 3/24* (2013.01); *Y02E 60/728* (2013.01); *Y04S 10/265* (2013.01)

(58) Field of Classification Search
CPC ....... H02J 3/24; Y04S 10/265; Y02E 60/728
See application file for complete search history.

(56) References Cited

U.S. PATENT DOCUMENTS

| 6,338,009 B1 | 1/2002 | Sato et al. |
| 2009/0222144 A1* | 9/2009 | Venkatasubramanian et al. ............................ 700/292 |
| 2013/0054035 A1* | 2/2013 | Berggren et al. ............. 700/286 |

FOREIGN PATENT DOCUMENTS

| EP | 1850441 A2 | 10/2007 | |
| WO | WO-2006/131017 A2 | 12/2006 | |
| WO | WO-2008/122253 A1 | 10/2008 | |
| WO | WO2011/015247 | * 8/2009 | ................ H02J 3/24 |

OTHER PUBLICATIONS

Zhian Zhong, "Power Systems Frequency Dynamic Monitoring System Design and Applications", Jul. 2005, Dissertation, Virginia Polytechnic Institute and State University, http://scholar.lib.vt.edu/theses/available/etd-08182005-105558/unrestricted/Dissertation-0824-submittion.pdf.*

(Continued)

*Primary Examiner* — Regis Betsch
(74) *Attorney, Agent, or Firm* — Winstead PC

(57) ABSTRACT

A method for determining the contribution of a grid subsystem (12) to oscillations in grid frequency experienced by an external electrical grid (14) in an electrical power network (10). A measurement of grid frequency is taken in the grid sub-system (12) and/or the external electrical grid (14). The measurement(s) of grid frequency can be used to extract oscillations in grid frequency in the grid subsystem (12) and/or the external electrical grid (14). A measurement of active power is recorded on a transmission line (16c) between the grid subsystem (12) and the external electrical grid (14). The phase relationship between the oscillations in grid frequency and the oscillations in active power allows the contribution of the grid subsystem (2) to oscillations in grid frequency in the external electrical grid (14) to be determined.

20 Claims, 5 Drawing Sheets

(56) References Cited

OTHER PUBLICATIONS

Richard Lyons, "Quadrature Signals: Complex, But Not Complicated", Nov. 2008, http://www.dspguru.com/dsp/tutorials/quadrature-signals.*

Wilson et al., "Identifying Sources of Dampening Issues in the Icelandic Power System", 2008, 16th PSCC Glasgow Scotland, Jul. 2008 pp. 1-8.*

Horvat, "Frequency fluctuations in power systems", 2007, Thesis University of Bergen.*

Hurtado-Albir, F., "International Search Report" for PCT/GB2010/051922, as mailed Dec. 21, 2011, 4 pages.

* cited by examiner

GRID OSCILLATION ANALYSIS METHOD AND APPARATUS THEREFOR

FIELD OF THE INVENTION

The present invention relates to a grid oscillation analysis method and apparatus therefor. More specifically, the invention relates to a method of determining whether a grid subsystem in an electrical grid is contributing to oscillations in grid frequency.

BACKGROUND TO THE INVENTION

Electric power networks are prone to grid oscillations. For example oscillations may be seen in grid frequency, grid power, grid voltage angle and/or the speed of generators and other equipment used as part of a grid.

The disclosure herein refers principally to oscillations in grid frequency and oscillations in grid power. However, it should be noted that oscillations of other grid metrics are intentionally encompassed within the scope of the disclosure.

Oscillations in grid frequency can be prejudicial to the proper operation of an electrical grid. Oscillations in grid frequency may, for example, cause interconnector tripping, relay tripping, loss of load or generating plant stress. Such oscillations often involve (and affect) many generating plants. For example, frequency oscillations may be caused by rotor speed oscillations in generators. Also, such oscillations in grid frequency may span boundaries between network areas under the control of different operating companies or perhaps even national boundaries.

For the avoidance of doubt, it is noted that as used herein the term "oscillation in grid frequency" when relating to electrical power networks encompasses variations in a nominal frequency of the network. For example, an electrical power network may provide power at a frequency of 60 Hz. However, the frequency may vary between say 59 Hz and 61 Hz with a period of say 20 seconds, although this is an extreme example of oscillations in grid frequency. Therefore, the term "oscillation in grid frequency" refers to the periodic deviations over time of the frequency in an electrical power network, e.g. the periodic swings of the nominal 60 Hz grid frequency between 59 Hz and 61 Hz.

The variations in grid frequency and/or power also have an oscillation frequency associated with them.

The term "grid frequency" encompasses the frequency of power provided by the network, e.g. the nominal 50 Hz or 60 Hz frequency of the grid and any deviation from the nominal value.

Under certain network conditions, the oscillations in grid frequency may be poorly damped or even unstable. FIG. 1 illustrates an unstable oscillation in grid frequency that led to system separation and load-shed relay tripping. More specifically, FIG. 1 shows a graph of grid frequency over time, in which a nominal 60 Hz system oscillates at low frequency with a period of about 20 seconds, with swings from 59 Hz to 61 Hz.

The present inventors have appreciated that it is at present difficult to determine if a particular grid subsystem, such as a generating plant, control area or some defined region of the grid is contributing positively or negatively to the stability of a oscillation in grid frequency, or merely responding to the oscillation in grid frequency.

It is therefore an object for the present invention to provide an electrical grid comprising apparatus that is operable to determine if a grid subsystem is contributing positively or negatively to the stability of oscillation in grid frequency.

It is a further object for the present invention to provide a method of determining if a grid subsystem in an electrical grid is contributing positively or negatively to the stability of oscillations in grid frequency.

STATEMENT OF INVENTION

According to the disclosure in a first aspect there is provided a method of determining the contribution of a grid subsystem to oscillations in grid frequency in an external electrical grid in an electrical power network, the method comprising: receiving a first quantity corresponding to the oscillations in grid frequency in the external electrical grid; receiving at least one second quantity, the at least one second quantity corresponding to oscillations in active power conveyed on at least one electrical connection between the grid subsystem and the external electrical grid; and determining at least one phase relationship between the first quantity and the at least one second quantity to determine the component of the second quantity that contributes to oscillations in grid frequency in the external electrical grid.

The applicant has identified that by determining a phase relationship between oscillations in grid frequency and oscillations in the active power conveyed on an electrical connection, it can be determined whether the subsystem is contributing to the oscillation or responding to it. Further, the magnitude of the component of oscillations in power in quadrature with the oscillations in grid frequency allows the quantification of the contribution of the grid subsystem to the oscillations in grid frequency.

As used herein, the term "grid subsystem" encompasses one or more electrical elements that may form part of an electrical power network. For example, a grid subsystem may comprise one or more generators and substations.

As used herein, the term "external electrical grid" encompasses any elements of an electrical power network that are external to a grid subsystem. The external grid may therefore represent the wider grid or, put another way, the remainder of the electrical power network.

As used herein, the term "electrical power network" encompasses any network of electrical elements that are interconnected for the purpose of providing electrical power.

The first quantity may be measured in the grid subsystem. Alternatively, the first quantity may be measured in the external electrical grid.

It is noted that a phase relationship is a relationship between two quantities oscillating at the same frequency, such that there is a consistent time shift between the peaks of the oscillating quantities. This time shift can be expressed in terms of a phase angle, or "phase relationship" between the quantities. There is an oscillation amplitude associated with each oscillating quantity, and together the angle and phase can be expressed as a vector. This vector can be decomposed into components for the purpose of analysis.

Optionally, the method may further comprise determining the magnitude of the component of the second quantity that is in quadrature with the first quantity.

Components of a signal that are in quadrature are orthogonal with another signal. That is they may lead or lag the other signal by 90 degrees. The applicant has identified that the contribution of a grid subsystem to oscillations in grid frequency in an external electrical grid may be determined by determining the component of oscillations in active power that lead or lag oscillations in grid frequency.

Optionally, the first quantity may comprise oscillations in grid frequency in the grid subsystem.

Often the grid subsystem may be more accessible than elements of the external electrical grid. This may be because the certain elements of the external electrical grid may be located in other territories or countries. Therefore advantages of ease of measurement arise when the first quantity corresponds to oscillations in grid frequency in the grid subsystem.

Measurements of the oscillations in grid frequency in the grid subsystem may correspond to the oscillations in grid frequency in the external electrical grid by denoting the type of grid oscillation as explained below. That is, if the type of grid oscillation is common mode then the oscillations in grid frequency in the external electrical grid will be the same phase as the oscillations in grid frequency in the grid subsystem. If the type of grid oscillation is opposing phase then the oscillations in grid frequency in the external electrical grid will be in opposing phase to the oscillations in grid frequency in the grid subsystem. In this way, measurements of grid frequency in both the grid subsystem and the external electrical grid correspond to oscillations in grid frequency in the external electrical grid.

Optionally, the method may further comprise receiving a third quantity comprising oscillations in grid frequency within the external electrical grid.

Receiving measurements corresponding to oscillations in grid frequency within the external electrical grid allows the more robust determination of the contribution to the oscillations as explained below.

Optionally, the method may further comprise measuring the first quantity within the grid subsystem, measuring the second quantity on the at least one electrical connection to the grid subsystem and measuring the third quantity within the external electrical grid.

Optionally, the method may further comprise determining whether oscillations in grid frequency in the grid subsystem are in common mode to oscillations in grid frequency in the external electrical grid in dependence on the frequency of the first quantity being less than 0.1 Hz.

Optionally, the method may further comprise determining whether oscillations in grid frequency in the grid subsystem are in common mode to oscillations in grid frequency in the external electrical grid in dependence on the first quantity being the same amplitude and phase as the third quantity.

Determining that the type of the oscillations of grid frequency are common mode allows the determination of whether a grid subsystem is contributing positively or negatively to oscillations in grid frequency based on the phase relationship of the first quantity to the second quantity. In common mode if a component of the second quantity leads the phase of the first quantity then the grid subsystem is determined to be negatively contributing to the oscillations.

Optionally, the method may further comprise determining the magnitude of a component of the second quantity leading the phase of the first quantity by 90 degrees.

Optionally, the method may further comprise determining whether oscillations in grid frequency in the grid subsystem are in opposing phase to oscillations in grid frequency in the external electrical grid in dependence on the frequency of the first quantity being greater than 0.2 Hz.

Optionally, the method may further comprising determining whether oscillations in grid frequency in the grid subsystem are in opposing phase to oscillations in grid frequency in the external electrical grid in dependence on the first quantity being 180 degrees out of phase to the third quantity.

Determining that the type of oscillations of grid frequency is opposing phase allows the determination of whether a grid subsystem is contributing positively or negatively to oscillations in grid frequency based on the phase relationship of the first quantity to the second quantity. In opposing phase if a component of the second quantity lags the phase of the first quantity when the first quantity comprises oscillations in grid frequency in the grid subsystem then the grid subsystem is determined to be negatively contributing to the oscillations.

Optionally, the method may further comprise determining a magnitude of a component of the second quantity lagging the phase of the first quantity by 90 degrees.

Optionally, the at least one electrical connection may comprises a plurality of electrical connections between the grid subsystem and the external electrical grid, and the second quantity may correspond to a summation of the oscillations in active power conveyed on each of the plurality of electrical connections.

Optionally, at least one electrical connection may comprise a plurality of electrical connections between the grid subsystem and the external electrical grid and receiving at least one second quantity may comprise receiving a plurality of second quantities each second quantity corresponding to oscillations in active power conveyed on one of the plurality of electrical connections, and determining at least one phase relationship may comprise determining a plurality of phase relationships between the first quantity and the plurality of second quantities to determine the components of the plurality of second quantities that contribute to oscillations in grid frequency in the external electrical grid Optionally, the method may further comprise determining the magnitudes of the components of the second quantities that are in quadrature with the first quantity.

Optionally, the method may further comprise summing the magnitudes of the components of the second quantities that are in quadrature with the first quantity.

According to the disclosure in a second aspect there is provided a method of determining the contribution of a grid subsystem of a plurality of grid subsystems to oscillations in grid frequency in an external electrical grid in an electrical power network, the method comprising: determining the contribution of a first grid subsystem of the plurality of grid subsystems according to the above method; determining the contribution of a second grid subsystem according to the above method, wherein the magnitude of the contribution of the first grid subsystem is greater than the magnitude of the contribution of the second grid subsystem; and normalising the magnitude of the second grid subsystem to the magnitude of the first grid subsystem.

Optionally the method may further comprise determining that the second grid subsystem is contributing to the oscillations in grid frequency in the external electrical grid if the normalised magnitude of the second grid subsystem is 0.5 or more.

According to the invention in a third aspect there is provided a computer program product comprising computer program code executable on a computer processor to carry out the method described above.

According to the disclosure in a fourth aspect there is provided an apparatus for determining the contribution of a grid subsystem to oscillations in grid frequency in an external electrical grid in an electrical power network, the apparatus comprising: a processor configured to receive a first quantity corresponding to the oscillations in grid frequency in the external electrical grid, receive at least one second quantity, the at least one second quantity corresponding to oscillations in active power conveyed on at least one electrical connection between the grid subsystem and the external electrical grid, and determine at least one phase relationship between the first quantity and the at least one second quantity to determine the component of the second quantity that contributes to oscillations in grid frequency in the external electrical grid.

Optionally, the processor may be further configured to determine a magnitude of the component of the second quantity that is in quadrature with the first quantity.

Optionally, the apparatus further comprises a first measurement unit in communications link to the processor and to the at least one electrical connection to the grid subsystem, the first measurement unit arranged to measure the first and/or second quantities and provide them to the processor.

Optionally, the first measurement unit may comprise a phasor measurement unit.

According to the disclosure in a fifth aspect there is provided an electrical grid comprising the apparatus described above.

When referring to oscillations in grid frequency in the first and second grid areas being 180 degrees out of phase, it is noted that this encompasses oscillations in grid frequency that are approximately 180 degrees out of phase. For example, the oscillations in grid frequency may be 180 degrees out of phase +/−45 degrees.

According to the disclosure in a fifth aspect there is provided an electrical grid comprising: a grid subsystem; measurement apparatus that is operable to measure a first quantity that corresponds to grid frequency on an electrical connection to the grid subsystem over time and to measure a second quantity that corresponds to active power conveyed on an electrical connection from the grid subsystem over time, each of the first quantity and the second quantity changing in an oscillatory fashion over time; and processing apparatus that is operable to determine a phase relationship between the first and second oscillating quantities.

In use, the measurement apparatus measures the first quantity, e.g. the grid frequency, and the second quantity, e.g. the active power. The first quantity, which corresponds to the oscillating grid frequency, oscillates at a frequency, e.g. below the nominal grid frequency at a frequency such as at 0.06 Hz, that is characteristic of grid oscillation. The second quantity oscillates in a fashion that is also characteristic of the grid oscillation. Hence it is the change, i.e. oscillation, in each of the first and second quantities over time, that is operated upon by the processing apparatus.

More specifically, the first quantity may be the grid frequency. Alternatively, the first quantity may be an angle measurement. An oscillation in the angle of a measured voltage is equivalent to an oscillation in grid frequency measured at substantially the same location, e.g. at the same bus, with a phase shift of 90 degrees. Alternatively the first quantity may be the angle of a generator rotor, although the same 90 degree phase shift is required. Alternatively, the first quantity may be generator rotor speed. The generator rotor may rotate at a frequency corresponding to the grid frequency and therefore oscillations in grid frequency may be apparent in the speed of the generator rotor.

Alternatively or in addition, the second quantity may be active power. The active power may be derived from voltage measurements, e.g. at a bus, and current measurements, e.g. in a circuit connecting to the bus. Alternatively or in addition, the second quantity may be current, e.g. as measured in a circuit connecting to the bus. Therefore, a measured current may correspond to oscillations in active power.

The processing apparatus is operative to determine the phase relationship between the oscillating first and second quantities. For example, the processing apparatus may be operative to determine if there is a phase difference between the oscillating first and second quantities.

An oscillation in frequency in an electrical grid may represent an oscillation in the rotational speed of rotating machines, e.g. generators, within the grid. The oscillation involves periodic acceleration and deceleration of the grid, or some parts of it, and rotating machines are accelerating and decelerating together with the frequency oscillation. These cyclic changes in rotational speed occur because of cyclic torques acting on the rotating components. The presence of oscillations in the speed of rotating masses in a grid or subsystem may mean that there are oscillations in mechanical and/or electrical power supplied to, or exported from the subsystem. Depending on the physical properties of the constituent parts, and the contribution of control systems, a subsystem of the grid may supply energy to sustain the oscillation or remove energy from the oscillations.

By measuring the oscillations in the first quantity, e.g. the grid frequency, at the subsystem and in the second quantity, e.g. the power flow from the subsystem to the wider grid, it is possible to identify whether the subsystem is improving or degrading the stability of the oscillations. In the case of common mode oscillations, if the oscillations in the second quantity lead the oscillations in the first quantity by between zero and 180 degrees, the subsystem is degrading the stability of the oscillation by supplying energy to sustain the oscillation. Hence, the operating company can carry out investigations on the grid subsystem to determine the nature of the problem. If the oscillations in the second quantity lag the oscillations in the first quantity by between zero and 180 degrees, the subsystem is improving the stability of the oscillation by extracting energy from the oscillation and providing damping of the oscillation. Hence, the operating company need not carry out investigations on the grid subsystem. Alternatively and where there is a cross boundary issue involving, for example, two or more operating companies, an operating company can demonstrate that its network area is not contributing to the grid oscillation. The extent of the positive or negative contribution may be related to the amplitude of the power swings and also how close the phase difference is to 90 degrees.

Hence, alternatively or in addition, the processing apparatus may be operable to determine if one of the first and second quantities leads the other of the first and second quantities.

Alternatively or in addition, the measurement apparatus may comprise a phasor measurement unit (PMU) that is operative to measure the first and second quantities on the electrical connection. Thus, the PMU may be operative to measure the oscillating grid frequency and active power signals.

The first quantity can be measured in a number of ways. More specifically, if the subsystem comprises a generation plant, the first quantity can be measured by measuring the speed of at least one rotating apparatus, such as a rotating shaft, turbine or generator of the generation plant. Where the generation plant comprises a plurality of generating units, an average of speed measurements at each of the rotating apparatus may be determined. Alternatively or in addition, the first quantity can be derived from measurement of a sinusoidal voltage waveform, e.g. at a bus. Alternatively or in addition, a measured first quantity may be synchronised with an external time reference, e.g. a Global Positioning System (GPS) time source.

Alternatively or in addition and where the subsystem comprises a plurality of generators, the first quantity may be measured at each of a plurality of different locations to provide plural first quantity measurements. More specifically, the oscillating first quantity operated upon by the processing apparatus may be determined by one of: averaging the plural first quantity measurements; determining a weighted average of the plural first quantity measurements; and selection of a single most appropriate first quantity measurement from the plural first quantity measurements.

Alternatively or in addition, the measurement apparatus may comprise an analogue to digital converter that is operative such that measured first and second quantities are output in a digital form. For example, the measurement apparatus may be operative to measure voltage and current waveforms, to convert each of the measured voltage and current signals to a digital form and to derive the first and second quantities from the digital voltage and current signals.

Alternatively or in addition, the processing apparatus may be operative to determine an extent of a phase difference between the measured oscillating first and second quantities.

Alternatively or in addition, the processing apparatus may comprise cross correlation apparatus that is operative to correlate the oscillating first and second quantities with each other. Thus, the cross correlation apparatus may be operative to determine an extent of a phase difference between the oscillating first and second quantities.

Alternatively or in addition, the processing apparatus may comprise output apparatus that is operable to provide an output to a user. More specifically, the output apparatus may be operable to provide a phase relationship between the first and second oscillating quantities to the user. The user may then draw one of the following conclusions from the phase relationship:

The subsystem is degrading the stability of the grid with respect to the type of oscillation.
The subsystem is responding to an oscillation in the grid and is contributing to the damping of the oscillation.
The subsystem is responding to an oscillation in the grid but is providing no positive or negative contribution to the damping of the oscillation.
The oscillation is transferred through a network of the subsystem, but the subsystem is not substantially responding in any way.

Alternatively or in addition, a frequency of oscillation of the first quantity and of the second quantity may be less than a grid frequency, e.g. a grid frequency of 50 Hz or 60 Hz.

More specifically, the frequency of oscillation may be less than substantially 10 Hz. More specifically, the frequency of oscillation may be less than substantially 5 Hz. More specifically, the frequency of oscillation may be less than substantially 100 mHz. Alternatively or in addition, the frequency of oscillation may be between substantially 0.003 Hz and substantially 2 Hz.

Alternatively or in addition, the grid subsystem may comprise one of: a power plant, such as a generator; a control area; and an electricity network area. The electricity network area may comprise at least one power plant or control area. The term 'control area' as used herein may mean the area of an electric grid that a transmission system operator has the responsibility for controlling.

The subsystem may be interconnected to the wider system by any number of electric transmission lines. The second quantity, e.g. active power, used according to the disclosure may be representative of the oscillation in the sum total of, e.g. the active power from the subsystem to the external electrical grid. The second quantity may be adequately represented by summing the second quantities in main transmission paths. Hence, alternatively or in addition, the electrical grid may comprise a plurality of electrical connections, e.g. main transmission paths, to the grid subsystem. For example, a first electrical connection may connect the subsystem to another subsystem and a second electrical connection may connect the subsystem to yet another subsystem. More specifically, the electrical grid may comprise a plurality of measurement apparatus, each measurement apparatus being operable to measure at least one of the first and second quantities on a different one of the plurality of electrical connections. More specifically, the processing apparatus may be operative: to determine an extent of contribution between at least one of the first and second quantities for each electrical connection; and to sum the determined extents. Thus, where there is a plurality of electrical connections to a grid subsystem it may be possible to determine if the grid subsystem is contributing positively or negatively to the stability of grid oscillation.

Alternatively or in addition, the electrical grid may be an electric power network.

According to a sixth aspect of the present disclosure there is provided a method of determining whether or not a grid subsystem in an electrical grid is contributing to grid oscillation, the method comprising: measuring a first quantity corresponding to grid frequency on an electrical connection to the grid subsystem over time and a second quantity corresponding to active power conveyed on an electrical connection to the grid subsystem over time by way of measuring apparatus, each of the first and second quantities changing in an oscillatory fashion over time; and determining by way of processing apparatus a phase relationship between the first and second oscillating quantities.

Embodiments of the sixth aspect of the present disclosure may comprise one or more features of the fifth aspect of the present disclosure.

According to a seventh aspect of the present disclosure there is provided a kit of parts configured to be installed in an electrical grid comprising a grid subsystem, the kit of parts comprising: measurement apparatus that upon installation is configured to and operable to measure a first quantity corresponding to grid frequency on an electrical connection to the grid subsystem over time and a second quantity corresponding to active power conveyed on an electrical connection electrical connection to the grid subsystem over time, each of the first and second quantities changing in an oscillatory fashion over time; and processing apparatus that upon installation is operable to determine a phase relationship between the first and second oscillating quantities.

Embodiments of the seventh aspect of the present disclosure may comprise one or more features of the fifth aspect of the present disclosure.

BRIEF DESCRIPTION OF DRAWINGS

Further features and advantages of the present disclosure will become apparent from the following specific description, which is given by way of example only and with reference to the accompanying drawings, in which.

SPECIFIC DESCRIPTION

Figure 1:
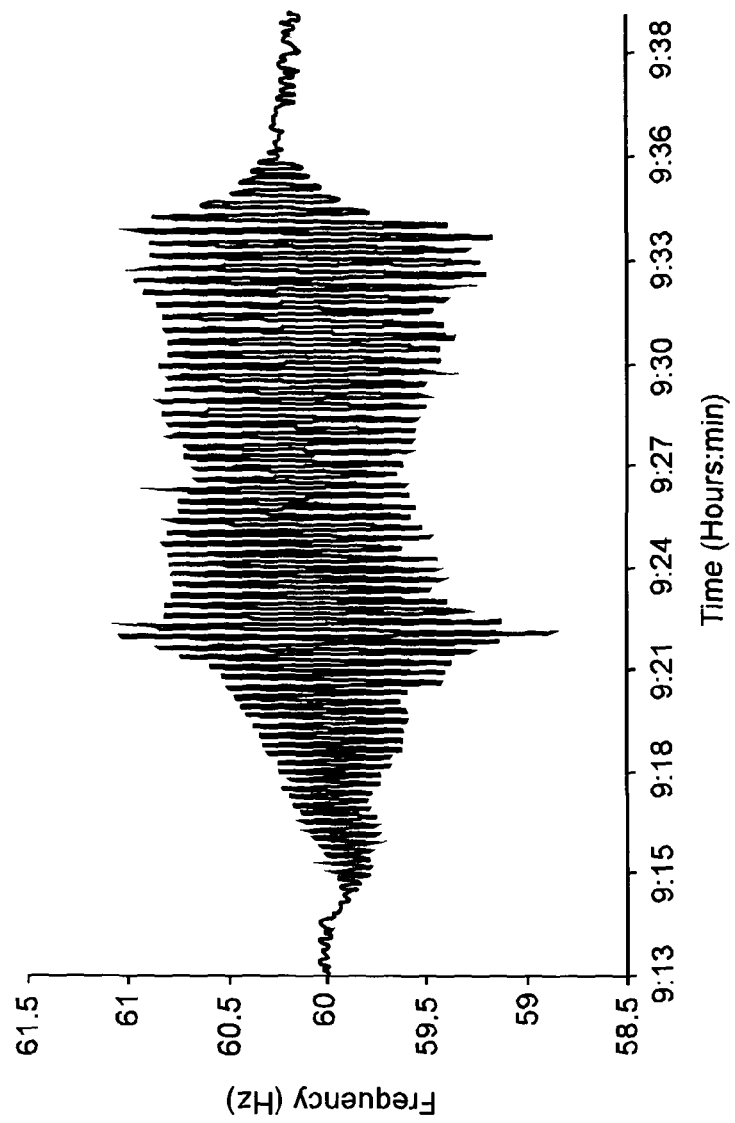
FIG. 1 is a graph of grid frequency over time that is subject to the effects of grid oscillation.

It is noted that the unstable oscillations of FIG. 1 should be distinguished over stable oscillations, which are oscillations that are damped and remain small. Stable oscillations may be damped inherently by the elements of the electrical grid without input from an operator. An operator can indirectly influence the damping of the electrical grid by changing the generation dispatch and therefore the power flows in the network. With appropriate information, an operator can improve the stability of the system by changing generation outputs.

Unstable oscillations grow in amplitude to a level that threatens the security of an electrical power network whereas stable oscillations remain small and do not necessarily threaten the security of an electrical power network.

The method of the invention applies in both cases and may be used to determine the contributions of grid subsystems to unstable oscillations in grid frequency and/or stable oscillations in grid frequency. FIG. 1 shows an example of unstable oscillations in grid frequency.

Generally, oscillations in grid frequency may be split into two groups: common mode frequency oscillations; and opposing phase frequency oscillations.

Common mode frequency oscillations occur when the entire grid frequency oscillates with substantially a coherent phase, i.e. in phase. If the frequency is measured anywhere in the grid practically the same oscillation would be seen. Both the amplitude and the phase of the oscillations are substantially the same throughout the grid. Common mode frequency oscillations where the frequency oscillation is in phase throughout the system tend to be at very low frequency, e.g. 0.06 Hz.

The skilled person will appreciate that two measured oscillating quantities are rarely precisely "in phase". For example, errors inherent in measuring techniques may mean that two signals that are in phase will not be measured as being exactly in phase. In addition, it is rare in an electrical power network that signals that are "in phase" exhibit exactly the same phase. Indeed, the skilled person will appreciate that "in phase" is a term that may be applied to two signals that are substantially in phase as explained below.

Opposing phase frequency oscillations occur where there exist two groups of generators operating in two areas of an electrical power network. Within a group generator frequencies oscillate roughly in phase with each other, but from one group to another there is a phase shift in frequency oscillations of about 180 degrees. Opposing phase frequency oscillations generally occur at a slightly higher frequency than common mode frequency oscillations, typically between 0.1 Hz and 2 Hz. Inter-area electro-mechanical oscillations are an example of opposing phase oscillations in grid frequency occurring in different areas of an electrical power network. Similarly, local mode electro-mechanical oscillations are also opposing phase oscillations, but the amplitude of the oscillations in opposite phase are much smaller than the swings in the main participating generator or generators.

Thus, with opposing phase frequency oscillations, if an oscillation in frequency is observed in the grid area of the first group of generators, it would be possible to find a location in the grid area of the opposing group where the frequency oscillation was substantially in opposing phase. There may be a different amplitude, but the shape of one frequency oscillation waveform is roughly a scaled mirror image of the other.

As with the common mode definition provided above, two signals in opposing phase are rarely precisely 180 degrees out of phase. Indeed, the skilled person will appreciate that characteristics of an electrical power network may determine that opposing phase is a term that may be applied to two signals that are substantially 180 degrees out of phase.

Inter-area oscillations are an example of opposing phase oscillations in which the opposing phase of the oscillations in grid frequency occurring in different areas of an electrical power network. An example of inter-area phase frequency oscillations is that the generators in Scotland may be in a first grid area and oscillate together as a group, and the generators in the north of England may be in a second grid area and also oscillate together to form a group. The two groups may swing in opposite phase at say approximately 0.5 Hz. In other examples the grid areas can be very large. There are modes of frequency oscillation that traverse the whole of Europe, with Spanish, Portuguese and French generators oscillating in opposite phase from the Balkans and Eastern Europe.

It is noted that when referring to phase lead or lag of power oscillations, the convention used herein is of positive power flow being from a grid subsystem to a grid.

Figure 2:
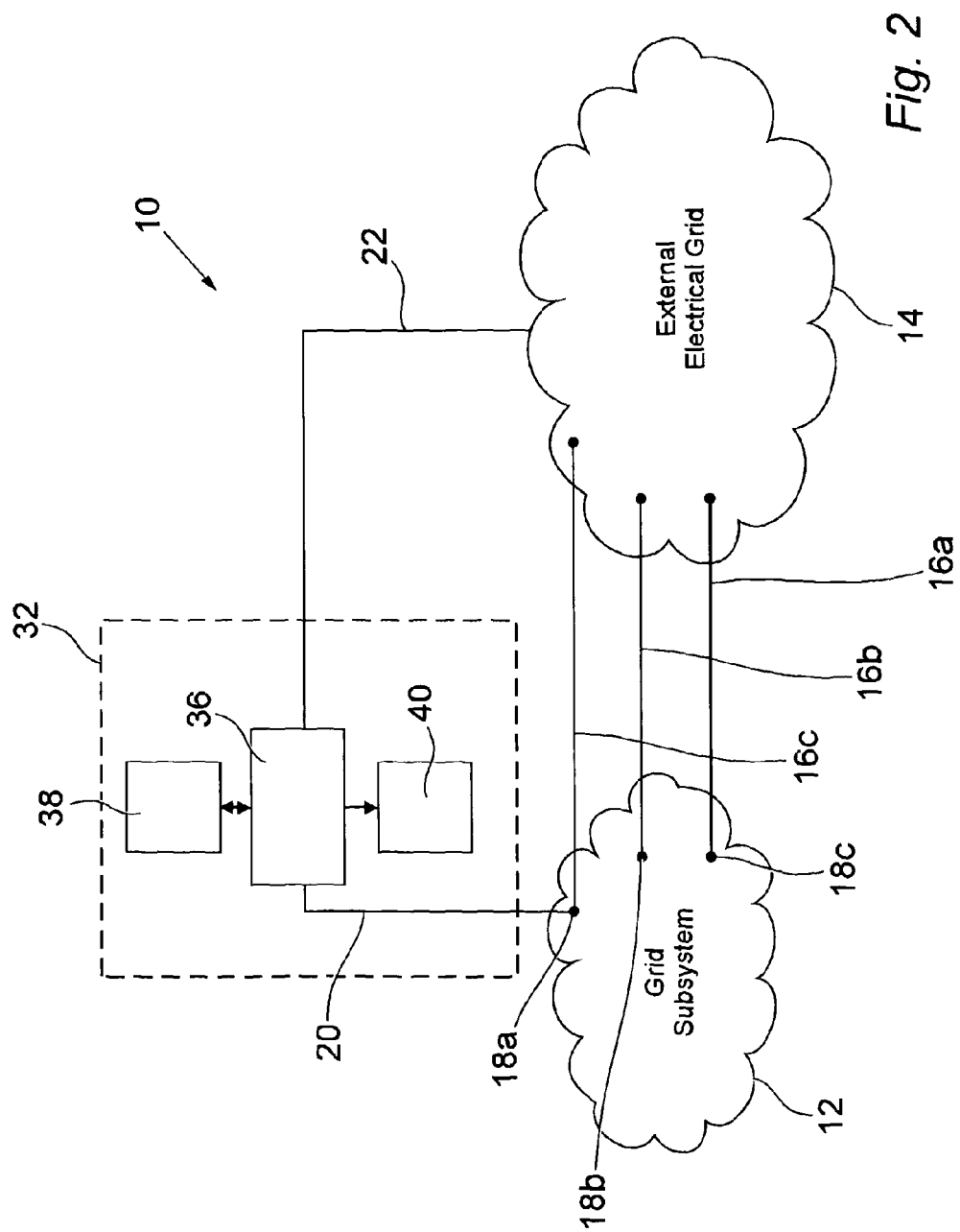
FIG. 2 is a schematic diagram of a grid subsystem connected to an electrical grid.

Referring to FIG. 2 there is shown a schematic representation of an electrical power network 10. FIG. 2 shows an electrical power network 10 in which it may be determined whether a grid subsystem 12 is contributing to oscillations in grid frequency.

The electrical power network 10 comprises a grid subsystem 12 and an external electrical grid 14. The grid subsystem 12 may be one or more power generators. The external electrical grid 14 may comprise further power generators and/or control areas interconnected within the external electrical grid.

The term "external electrical grid" 14 relates to all elements of the electrical power network that are separate or external to the grid subsystem 12.

The grid subsystem 12 is connected to the external electrical grid 14 by means of electrical connections (or transmission lines) 16a, 16b, 16c. Frequency measurement units 18a, 18b, 18c, which may be phasor measurement units (PMUs), are operable to measure a frequency of a voltage present in the grid subsystem 12. The PMUs 18a, 18b, 18c may be positioned at the end of the transmission lines 16a, 16b, 16c respectively and may therefore be positioned just within or at the boundary of the grid subsystem 12. However, the skilled person will understand that the PMUs 18a, 18b, 18c may be placed in other locations within the grid subsystem 12 suitable for measuring the frequency of the voltage within the grid subsystem 12.

The frequency of the voltage waveform oscillates or varies over time and the measured variation may constitute a first quantity.

The frequency and active power measurements from the PMUs are electrically conveyed to a central location 32. This is shown schematically in FIG. 2 by the communications connection 20 from PMU 18a to the central location 32. The communications connection 20 may be a wired or wireless communication connection, an optical data connection or any other form of data communications connection as will be known to the skilled person. The central location 32 contains a computer having a central processor 36, data storage 38 and an output device 40. The central processor 36 is configured to perform digital signal processing operations, such as cross-correlation. The design and implementation of the aforementioned electronic apparatus present in the central location and firmware required to perform the data processing, including cross-correlation, is readily within the scope of the ordinary design skills of the skilled person.

The frequency and power measurements taken by the PMUs 18a, 18b, 18c are conveyed to the processor 36 via communications connection 20.

In addition, one or more measurement units may be located within the external electrical grid 14. The measurement units within the external electrical grid 14 convey frequency measurements from within the external electrical grid 14 to the processor 36 via communications connection 22.

Fundamental characteristics of an oscillation in grid frequency may be observed in voltage phasor angle measurements or e.g. in generator rotor speed oscillations, which can be used as a substitute for frequency measurements. In the case of voltage angle, there is generally a 90 degree phase shift, but the concept still holds.

The PMUs 18a, 18b, 18c may also be operable to measure variations in active power, which may constitute a second quantity, conveyed on the electrical connections 16a, 16b, 16c.

The quantities measured with the PMUs 18a, 18b, 18c are synchronised. Synchronisation may be achieved within a PMU or may be achieved with an external time reference, such as from a GPS time source. Each of the PMUs 18a, 18b, 18c may be an AREVA P847 from AREVA T&D of St. Leonards Avenue, ST17 4 LX, Stafford, United Kingdom. Each of the PMUs is operative to output digital data.

The electrical power network 10 of FIG. 2 may be subject to an oscillation in grid frequency, e.g. a common mode oscillation of the form represented in FIG. 1 or an opposing phase oscillation.

The grid frequency in the grid subsystem is measured by the PMU 18a. Further, the grid frequency in the external electrical grid 14 is measured at a location within the external electrical grid 14. The location at which the grid frequency in the external electrical grid 14 is measured is not shown in FIG. 2. In general, the location of such a measurement should be far away from the grid subsystem 12 so that it is less likely to be influenced by the oscillations in the grid subsystem 12.

The measurement unit(s) located in the external electrical grid 14 may be PMUs. However, other measurement units that are within the knowledge of the skilled person and are suitable for measurement of grid frequency may be used. Additionally, the skilled person will appreciate that there may be a plurality of frequency measurements recorded in the grid subsystem 12 and/or the external electrical grid 14.

The PMU 18a may be configured to measure the frequency of the voltage in the grid subsystem 12. The frequency of the voltage in the grid subsystem may then be transmitted to the processor 36. From the frequency of the voltage waveform the processor 36 is able to measure the oscillation in grid frequency within the grid subsystem over time. It will be apparent to the skilled person that other methods of measuring oscillation in grid frequency may be used within the scope of the present disclosure.

If there is more than one available measurement of grid frequency in the grid subsystem 12 the most important may be selected for use. The most important measurement may for example be the measurement exhibiting the largest oscillation in frequency within the subsystem 12.

Similarly, the measurement unit located in the external electrical grid 14 may be configured to measure the frequency of the voltage in the external electrical grid 14. The frequency of the voltage is conveyed to the processor 36 via a communications connection 22. The communications connection 22 may be a wired or wireless communication connection, an optical data connection or any other form of data communications connection as will be known to the skilled person. From the frequency of the voltage the processor 36 is able to calculate the oscillation in grid frequency within the external electrical grid over time. It will be apparent to the skilled person that other methods of measuring oscillation in grid frequency may be used within the scope of the present disclosure.

Using the extracted oscillation in grid frequency in the grid subsystem 12 and the extracted oscillation in grid frequency in the external electrical grid 14, the processor may be configured to determine whether the oscillations in the grid frequency in the grid subsystem 12 and the external electrical grid 14 are common mode or opposing phase.

This may be done by comparing the amplitude and phase of the measurements of oscillations in grid frequency in the grid subsystem 12 to the amplitude and phase of the measurements of oscillations in grid frequency in the external electrical grid 14. If both sets of measurements are substantially similar in amplitude and phase, then it may be determined that the oscillations in grid frequency are common mode. Otherwise, the oscillations in grid frequency are considered to be opposing phase.

In the common mode case, when comparing the oscillations in grid frequency in the grid subsystem 12 and the oscillations in grid frequency in the electrical grid 14 errors inherent in the measurement of the two quantities may mean that the frequency oscillations are not precisely the same phase. In addition, the characteristics of the electrical power network 10 may be such that signals that are not exactly in phase may still be considered to be in common mode oscillation.

There must be a phase shift between the frequencies in different locations, otherwise there would be no oscillating power flow and the oscillation would not be sustained. This phase difference tends to be small, e.g. less than 10 degrees.

For example, in some embodiments the phase of the oscillations in grid frequency in the grid subsystem 12 and the external electrical grid 14 may be in common mode oscillation if they are the same phase plus or minus 45 degrees. Alternatively, the phase of the oscillations in grid frequency in the grid subsystem 12 and the external electrical grid 14 may be in common mode oscillation if they are the same phase plus or minus 30 degrees. Alternatively, the phase of the oscillations in grid frequency in the grid subsystem 12 and the external electrical grid 14 may be in common mode oscillation if they are the same phase plus or minus 20 degrees. Alternatively, the phase of the oscillations in grid frequency in the grid subsystem 12 and the external electrical grid 14 may be in common mode oscillation if they are the same phase plus or minus 10 degrees. Alternatively, the phase of the oscillations in grid frequency in the grid subsystem 12 and the external electrical grid 14 may be in common mode oscillation if they are the same phase plus or minus 5 degrees.

Additionally, similar phenomena may be seen when comparing measurements of the amplitude of the oscillations in grid frequency. Therefore, the oscillations in grid frequency in the grid subsystem 12 and the external electrical grid 14 may be considered the same for determining common mode oscillation if they are the same amplitude plus or minus 20%. Alternatively, the amplitude of the oscillations in grid frequency in the grid subsystem 12 and the external electrical grid 14 may be considered the same for determining common mode oscillation if they are the same amplitude plus or minus 10%. The amplitude of the oscillations in grid frequency in the grid subsystem 12 and the external electrical grid 14 may be considered the same for determining common mode oscillation if they are the same amplitude plus or minus 5%.

In the opposing phase case, when comparing the oscillations in grid frequency in the grid subsystem 12 and the oscillations in grid frequency in the electrical grid 14 errors inherent in the measurement of the two quantities may mean that the frequencies are not precisely 180 degrees out of phase. In addition, the characteristics of the electrical power network 10 may be such that signals that are not 180 degrees out of phase may still be considered to be in opposing phase oscillation. Considering that the angles relate to the relative positions of generator rotors of different sizes and types of machines connected through electrical transmission lines, an exactly symmetrical opposing phase oscillation may be very unlikely in an electric power network.

For example, in some embodiments the phase of the oscillations in grid frequency in the grid subsystem 12 and the external electrical grid 14 may be in opposing phase oscillation if they are 180 degrees out of phase plus or minus 45 degrees. Alternatively, the phase of the oscillations in grid frequency in the grid subsystem 12 and the external electrical grid 14 may be in opposing phase oscillation if they are 180 degrees out of phase plus or minus 30 degrees. Alternatively, the phase of the oscillations in grid frequency in the grid subsystem 12 and the external electrical grid 14 may be in opposing phase oscillation if they are 180 degrees out of phase plus or minus 10 degrees. Alternatively, the phase of the oscillations in grid frequency in the grid subsystem 12 and the external electrical grid 14 may be in opposing phase oscillation if they are 180 degrees out of phase plus or minus 5 degrees. The term "opposing phase" therefore applies to frequency measurements corresponding to any of the above examples.

It is also possible to determine whether the oscillations in grid frequency are common mode or opposing phase without any comparison of oscillations in grid frequency measurements from the grid subsystem 12 and the external electrical grid 14. For example, if calculated oscillations in grid frequency are only available from the grid subsystem or the external electrical grid then the type of oscillation may be inferred.

In such circumstances the type of the oscillations in grid frequency may be determined on the basis of the frequency of the calculated oscillations in grid frequency.

That is, if the calculated oscillation in grid frequency within the grid subsystem 12 or the external electrical grid 14 is less than 0.2 Hz then the oscillations in grid frequency can be determined to be common mode throughout the entire electrical power network 10 including the subsystem 12. Alternatively, if the calculated oscillation in grid frequency within the grid subsystem 12 or the external electrical grid 14 is less than 0.1 Hz then the oscillations in grid frequency can be determined to be common mode throughout the entire electrical power network 10 including the subsystem 12. Alternatively, if the calculated oscillation in grid frequency within the grid subsystem 12 or the external electrical grid 14 is less than 0.06 Hz then the oscillations in grid frequency can be determined to be common mode throughout the entire electrical power network 10 including the subsystem 12.

Otherwise, if the oscillations in grid frequency measured within the grid subsystem 12 or the external electrical grid 14 are greater than 0.2 Hz then the oscillations in grid frequency can be determined to be opposing phase. In other embodiments, if the oscillations in grid frequency measured within the grid subsystem 12 or the external electrical grid 14 are greater than 0.1 Hz then the oscillations in grid frequency can be determined to be opposing phase.

Therefore it is possible to infer from measurements in a grid subsystem that there is a part of the grid oscillating at approximately 180 degrees out of phase to the grid subsystem, even if no measurements are taken showing this. In practice, if an oscillation is observed in a grid subsystem with a significant/measurable amplitude at one location, and the oscillation is not measurable, or is measurable with a much smaller amplitude at another location, then it can be inferred that somewhere in the grid there is an opposing frequency oscillation.

The threshold for determining whether oscillations are common mode or opposing phase may be set between 0.1 Hz and 0.2 Hz. Oscillations below the threshold are considered to be common mode and oscillations above the threshold are considered to be opposing phase.

The same principles may also be applied if a measurement in the external electrical grid 14 is close to the grid subsystem 12.

Active power may be measured on the electrical connection 16a between the grid subsystem 12 and the external electrical grid 14. The active power measurement may be taken by the PMU 18a and conveyed to the central processor 36. The central processor may be configured to calculate (or extract) the oscillations in active power over time.

The central processor 36 is operative to cross-correlate the calculated oscillations in grid frequency and oscillations in active power signals from the PMU 18a to determine a phase relationship between the oscillations in active power and the oscillations in grid frequency. In one embodiment, the central processor 36 may be configured to determine a magnitude of the component of oscillations in power that is in quadrature with the oscillations in grid frequency.

Also, the central processor 36 may be operative to cross-correlate the calculated oscillations in grid frequency and oscillations in active power signals from other PMUs to determine a magnitude of the component of oscillations in power that is in quadrature with the oscillations in grid frequency.

If it is determined that the oscillations in grid frequency are common mode then the contribution of the grid subsystem 12 to the oscillations in grid frequency can be determined by determining the magnitude of the oscillations in active power that are in quadrature with the oscillations in grid frequency. That is, the magnitude of the component of the oscillation in active power that leads the oscillations in grid frequency by 90 degrees. The central processor 36 is therefore configured to determine the contribution of the grid subsystem to the oscillations in grid frequency in this way if it is determined that the oscillations in grid frequency are in common mode.

The contribution of a grid subsystem 12 to the oscillations in grid frequency in the external electrical grid 14 may be measured in power.

The contribution may be determined as the component of a vector representing oscillations in active power in quadrature, i.e. at 90 degrees, to a vector representing oscillations in grid frequency in the grid subsystem or the external electrical grid.

The phase angle between the vector representing oscillations in active power and the vector representing oscillations in grid frequency may be used together with the magnitude of the vector representing oscillations in active power in order to derive the contribution. The contribution may be determined as $$\text{Contribution} = P \sin(\text{delta})$$

Where P is the magnitude of the vector representing oscillations in active power and delta is the phase angle between the vector representing oscillations in active power and the vector representing oscillations in grid frequency.

This is the component of power oscillation in quadrature to the frequency oscillation.

The phase angle may also be used without magnitude to identify whether the subsystem is contributing positively or negatively to the oscillation.

For the avoidance of doubt it is noted that if the oscillations in active power lead the oscillations in grid frequency by between 0 and 180 degrees a component of the oscillations in active power will lead the oscillations in grid frequency by 90 degrees.

If it is determined that the oscillations in grid frequency are in opposing phase then the contribution of the grid subsystem 12 to the oscillations in grid frequency can be determined by determining the magnitude of the oscillations in active power that are in quadrature with the oscillations in grid frequency in the external electrical grid 14. That is the magnitude of the component of the oscillation in active power that leads the oscillations in grid frequency in the external electrical grid 14 by 90 degrees. The central processor 36 is therefore configured to determine the contribution of the grid subsystem to the oscillations in grid frequency in this way if it is determined that the oscillations in grid frequency are in opposing phase.

The skilled person will appreciate that if the grid oscillations are in opposing phase then the oscillations of the grid subsystem 12 are substantially 180 degrees out of phase with the oscillations of the external electrical grid 14. Therefore the magnitude of the component of the oscillations in active power that leads the oscillations in grid frequency in the external electrical grid 14 by 90 degrees corresponds to the magnitude of the component of the oscillations in active power that lags the oscillations in grid frequency in the grid subsystem 12 by 90 degrees.

Further, either the oscillations in grid frequency in the grid subsystem 12 or the oscillations in grid frequency in the external electrical grid 14 may be inferred as described above. Therefore, the contribution of the grid subsystem 12 to the oscillations in grid frequency in the external electrical grid may be determined by comparison of the oscillations in active power with an inferred estimate of the oscillations in grid frequency.

The result, i.e. positive contribution, negative contribution or no contribution, and the extent or magnitude of the contribution is then output on the output device 40 whereupon the operator may take appropriate action. The nature of the phase relationship between oscillations in grid frequency and oscillations in active power is described below with reference to FIGS. 4A and 4B, which specify a generator as the grid subsystem.

Figure 3:
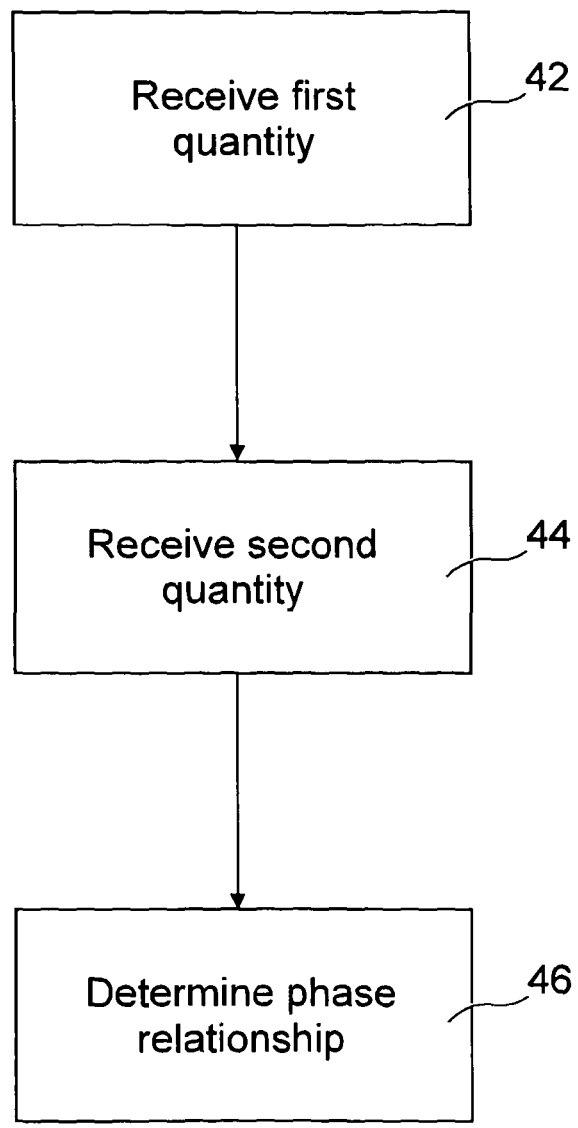
FIG. 3 shows a method of determining the contribution of a grid subsystem to oscillations in grid frequency in an external electric grid.

FIG. 3 shows a method of the contribution of a grid subsystem 12 to oscillations in grid frequency in an external electrical grid 14 in an electrical power network 10. The method comprises receiving a first quantity 42 at a processor 36.

The first quantity corresponds to oscillations in grid frequency in the grid subsystem 12. That is the first quantity may be used to determine the oscillations in the grid frequency in the grid subsystem. However, it is noted that the first quantity may correspond to oscillations in grid frequency in the external electrical grid. That is the first quantity may be used to determine the oscillations in the grid frequency in the external electrical grid.

The first quantity may be the grid frequency of a voltage waveform in the grid subsystem 12 recorded over time. Alternatively the first quantity may be an angle measurement, i.e. a voltage phase angle measurement. Variations in the first quantity over time are therefore representative of the oscillation in grid frequency.

The method also comprises receiving a second quantity 44 at the processor 36.

The second quantity corresponds to oscillations in active power conveyed on at least one of the electrical connections 16a, 16b, 16c between the external electrical grid 14 and the grid subsystem 12. That is, the second quantity may be used to determine the variation in the active power over time. The second quantity may be active power derived from measurements of a voltage and a current recorded over time. The skilled person will be aware of how to calculate active power based on the combination of these measurements. The second quantity may alternatively be a current recorded over time. The skilled person will be aware of how to calculate active power based on either of these measurements. Oscillations in the second quantity over time therefore represent variations in the active power, or alternatively, variations in the current.

The method also comprises determining a phase relationship 46 between the first and second quantities to determine the component of the second quantity that contributes to oscillations in grid frequency in the external electrical grid. This phase relationship may be determined by the processor 36. Determining a phase relationship may comprise determining whether there is a phase difference between the first and second quantities. Further, the processor 36 may be configured to determine whether the oscillations in active power lead the oscillations in grid frequency by between 0 and 180 degrees. Further, the processor 36 may be configured to determine the magnitude of a component of the oscillations in active power that lead the oscillations in grid frequency by 90 degrees.

If the oscillations in active power lead the oscillations in grid frequency in the external electrical grid 14 by between 0 and 180 degrees then the grid subsystem is contributing negatively to the oscillations in grid frequency in the external electrical grid 14. That is, the grid subsystem is supplying energy to sustain the oscillations in grid frequency in the external electrical grid.

If the oscillations in active power lag the oscillations in grid frequency in the external electrical grid 14 by between 0 and 180 degrees then the grid subsystem is contributing positively to the oscillations in grid frequency in the external electrical grid 14. That is, the grid subsystem is extracting energy in order to damp the oscillations in grid frequency in the external electrical grid.

The extent of the positive or negative effect is related to a magnitude of a component of the oscillations in active power that lead or lag the oscillations in grid frequency of the external electrical grid by substantially 90 degrees.

That is, in the common-mode case (i.e. frequency oscillations in-phase throughout a grid subsystem) a phase lead of the oscillations in active power over the oscillations in grid frequency of the external electrical grid 14 implies that the grid subsystem 12 is contributing to oscillations in grid frequency in the external electrical grid 14 negatively (i.e. making them worse).

The method may further comprise measuring the first and/or second quantities. This may be done using the measurement units 18a, 18b, 18c, which provide the measured quantities to the processor 36. The oscillation in grid frequency and oscillation in active power may be calculated by analysing discrete time sequential measurements of the first quantity and second quantities respectively. The analysis may be performed by a measurement unit 18a, 18b, 18c or by the processor 36.

In some embodiments of the present disclosure, active power may be measured on a plurality of electrical connections 16a, 16b, 16c between the grid subsystem 12 and the external electrical grid 14. The plurality of measurements of active power may be taken by PMUs 18a, 18b and 18c respectively and conveyed to the central processor via communications connections (not shown).

If a plurality of measurements of active power is taken from the electrical connections 16a, 16b, 16c then the central processor 36 may be configured to calculate (or extract) a plurality of oscillations in active power, one relating to each electrical connection 16a, 16b, 16c. The second quantity may comprise a summation of all the calculated oscillations in active power. In this case, the convention of power flow from the grid subsystem 12 to the external electrical grid 14 being positive is used. The central processor 36 may also be further configured to determine the contribution of the grid subsystem 12 in the manner described above using the summed active powers for the second quantity.

In alternative embodiments a plurality of second quantities may comprise the plurality of calculated oscillations in active power. The central processor 36 may therefore be configured to determine a plurality of phase relationships. In some embodiments, the central processor may be configured to determine a plurality of magnitudes of components of oscillations in active power that are in quadrature to oscillations in grid frequency. The central processor may be further configured to determine a contribution of the grid subsystem to oscillations in grid frequency by summing the plurality of magnitudes of components of oscillations in active power that are in quadrature to oscillations in grid frequency.

The above method provides an indication as to whether the first grid subsystem 12 is contributing positively or negatively to the stability of oscillations in grid frequency in the electrical grid and the extent of that contribution.

In other embodiments of the present disclosure the electrical power network may comprise a plurality of grid subsystems. In such embodiments the contribution of each grid subsystem to the oscillations in grid frequency in the external electrical grid may be determined according to the method set out above.

In such cases the magnitude of the contribution of each grid subsystem will be different. The magnitude of the contribution of one grid subsystem will be greater than the magnitude of the contribution of the other grid subsystems.

The applicants have realised that it is advantageous when a plurality of grid subsystems are contributing to oscillations in grid frequency in an external electrical grid to determine the contribution of each grids subsystem relative to the other grid subsystems. Therefore, in the case where a first grid subsystem has the largest magnitude of contribution to the grid frequency oscillations then a magnitude of the contribution of a second (and subsequent) grid subsystem is normalised to the contribution of the first grid subsystem.

That is, the magnitude of the contribution of the first grid subsystem is normalised to 1 and the magnitude of the contributions of the other grid subsystems is amended accordingly to be a value between −1 and 1. For example if the magnitude of the contribution of the second grid subsystem is half the magnitude of the contribution of the first grid subsystem then the normalised values of the magnitude of the contributions of the first and second grid subsystems would be 0.5 and 1 respectively. As an additional example, if the magnitude of the contribution of the second grid subsystem is half the magnitude (and negative, i.e. in the opposite direction) of the contribution of the first grid subsystem then the normalised values of the magnitude of the contributions of the first and second grid subsystems would be −0.5 and 1 respectively.

In some embodiments of the present disclosure the second (and subsequent) grid subsystems are considered to be contributing to the oscillations in grid frequency in the external electrical grid if the normalise magnitude of the contribution is 0.5 or greater. That is, the contribution of a grid subsystem to oscillations in grid frequency in an external electrical grid is only considered to be significant if the normalised magnitude of the contribution of the grid subsystem is 0.5 or greater.

Figure 4A:
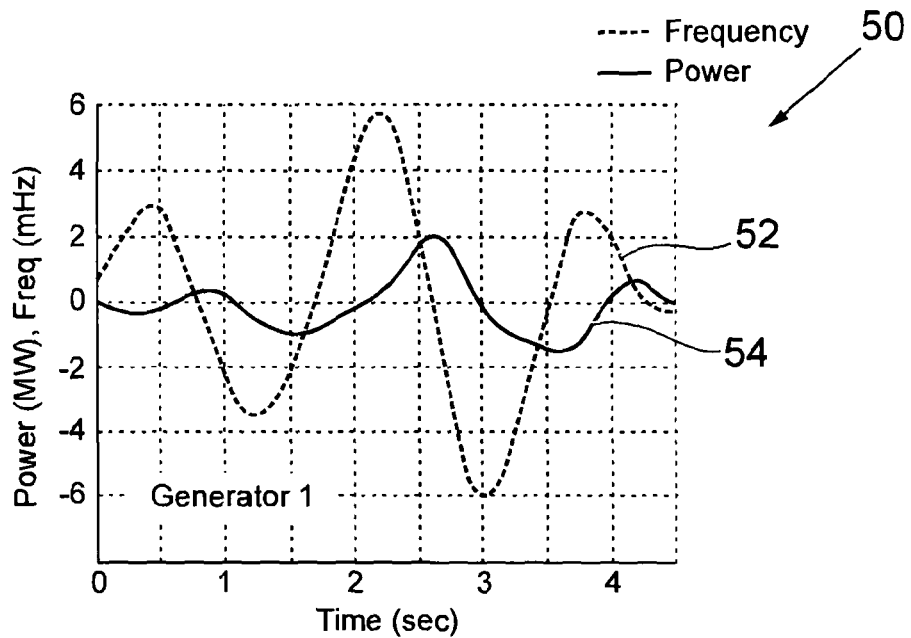
FIG. 4A is a graph in which the oscillating active power lags the oscillating grid frequency.

FIG. 4A shows plots 50 of oscillations in grid frequency 52 by way of the dotted line and oscillations in active power 54 by way of the solid line against time. The oscillations in grid frequency in plot 52 are shown as deviation from the grid frequency, which in the present case is 60 Hz. That is, 0 Hz in FIG. 4A represents a 60 Hz grid frequency. The oscillations in active power in plot 54 are likewise detrended to show active power oscillations around to 0 MW. Hence, the plots in FIG. 4A only show the oscillation in grid frequency and active power over time, and not the steady-state components that are caused by the oscillation in grid frequency. As can be seen, the active power plot lags the grid frequency plot; this is indicative of the generator responding to oscillation in grid frequency.

Figure 4B:
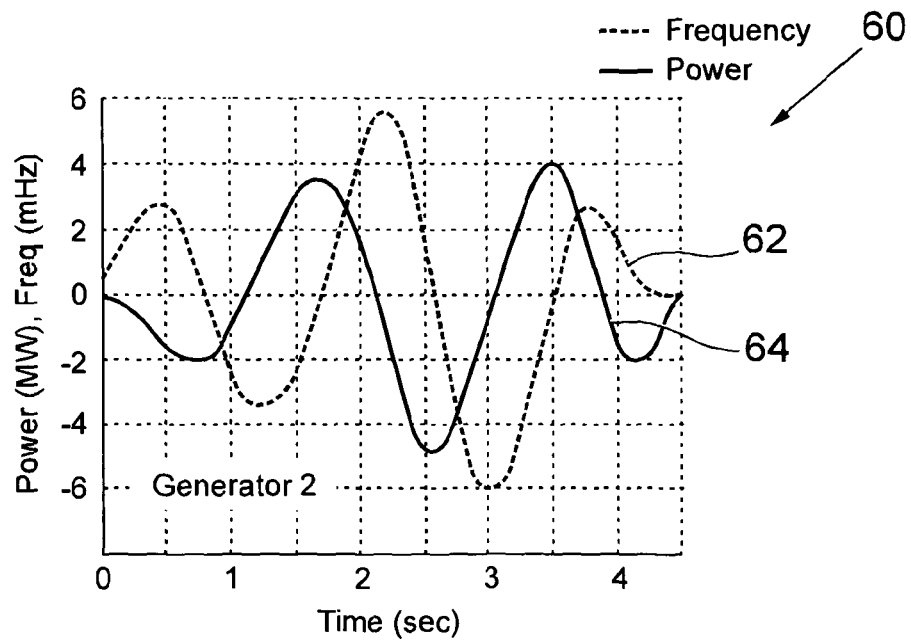
FIG. 4B is a graph in which the oscillating active power leads the oscillating grid frequency.

FIG. 4B shows plots 60 of oscillations in grid frequency 62 by way of the dotted line and oscillations in active power 64 by way of the solid line against time. As with FIG. 4A, the plots in FIG. 4B are detrended such that they only show the oscillations in grid frequency and active power over time, and not the steady-state components that are caused by the grid oscillation. As can be seen, the oscillations in the active power plot lead the frequency plot; this is indicative of the generator contributing to oscillation in grid frequency.

The skilled person will appreciate that the measurement units (PMUs) 18a, 18b, 18c are not essential. The magnitude of contribution of a grid subsystem may be determined by determining the phase relationship between the first quantity and the second quantity measured by a PMU. Measurements of the first and second quantities may be provided to the processor 36 by other parties or means. For example, measurements of frequency and active power may be taken in other territories or countries by third parties and conveyed to the central location 32 where the method of the present disclosure may be carried out.

Additionally, in embodiments where a measurement unit is used to measure first and second quantities on an electrical connection to a grid subsystem, a single measurement unit may provide sufficient information to determine whether a grid subsystem is contributing to oscillations in grid frequency in an external electrical grid. In such embodiments, there is no requirement to sum quantities as mentioned above. The phase relationship between the first and second quantity from the measurement unit is sufficient to determine whether there is a contribution. The magnitude of the contribution may be determined from the magnitude of a component of the oscillations in active power that leads the oscillations in grid frequency by 90 degrees.

Figure 5:
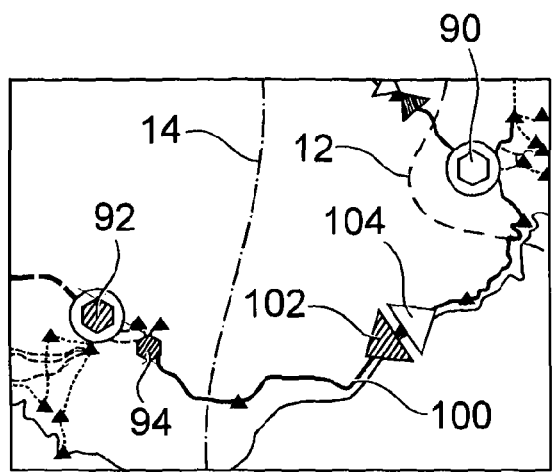
FIG. 5a-c shows illustrative displays that may be provided by a device according to the disclosure.
Figure 5:
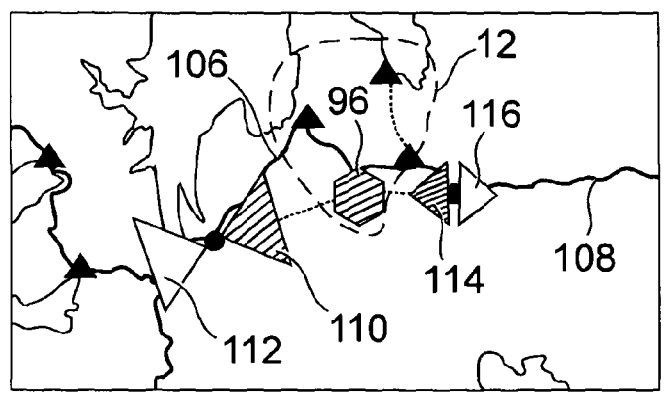
Figure 5:
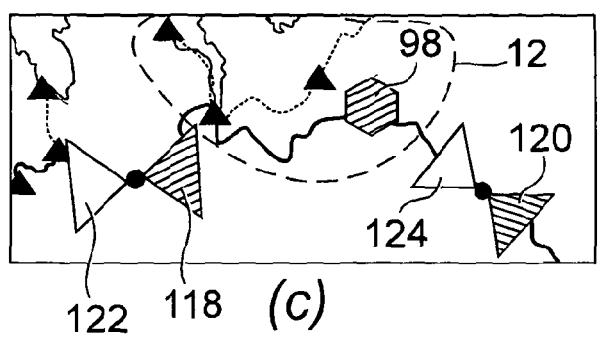

Referring to FIG. 5 a-c there is shown a series of display screens that may be output by the device 40. The display screens show maps of different regions with grid subsystems 92, 94, 96, 98 and various electrical connections to the grid subsystems. Arrows are shown on the electrical connections. The size of each arrow corresponds to the magnitude of a contribution of the grid subsystem 12 to oscillations in grid frequency in the external electrical grid 14.

Referring to FIG. 5a, the unshaded hexagon 90 indicates a frequency oscillation measurement in a grid subsystem. This oscillation in frequency is defined as the phase reference, i.e. 0 degrees. The shaded hexagons 92 and 94 represent frequency oscillation measurements in opposing phase to the reference 90 in an external electrical grid.

Therefore, referring to FIG. 2, the unshaded hexagon 90 may be within the grid subsystem 12 and the shaded hexagons 92, 94 may be within the external electrical grid 14.

Electrical connection 100 has arrows 102, 104 displayed upon it. The arrow 102 represents the influence of variations in active power on the oscillations in grid frequency of the external electrical grid. The arrow 104 represents the influence of oscillations in active power in the electrical connection 100 on the oscillations in grid frequency in the grid subsystem. The size of arrows 102, 104 is determined by firstly determining a phase relationship between the oscillation in grid frequency of the external electrical grid or the grid subsystem and the oscillation in active power conveyed on the electrical connection 100. The size of the arrows 102, 104 may correspond to the magnitude of the component of the oscillations in active power that lead the oscillations in grid frequency in the shaded and unshaded groups respectively, by substantially 90 degrees.

Referring to FIG. 5b, the electrical connections 106, 108 both connect to a grid subsystem 12. The grid subsystem 12 has a measurement of oscillations in grid frequency recorded within the subsystem 96. Arrows 110, 112 are displayed on connections 106, and arrows 114, 116 are displayed on connection 108. The size of the arrows is determined as described above and represents the magnitude of the contribution of the grid subsystem 12 to oscillations in the external electrical grid.

Therefore, a summation of arrows 112 (negative) and 116 (positive) shows the contribution of grid subsystem 12 on the external electrical grid. Specifically, the magnitude of the contribution on connection 106 corresponding to arrow 112 may be subtracted from the magnitude of the contribution on connection 108 corresponding to arrow 116 to determine the contribution of grid subsystem 12 on the oscillations in grid frequency of the external electrical grid.

In the example shown in FIG. 5b the grid subsystem 12 is damping the oscillations in grid frequency in the external electrical grid as summation of the contributions illustrated by the arrows 112 and 116 gives a negative result.

Referring to FIG. 5c, grid subsystem 12 does not contribute to the oscillations in grid frequency of the external electrical grid as shown by the relative sizes of arrows 112 and 124, which illustrate the contributions of the grid subsystem, are substantially equal.

The present disclosure allows the determination and display of: the grid subsystems, regions or plants contributing to an oscillation in grid frequency in an external electrical grid; and the transmission corridors or connections where power oscillations are influencing the oscillations in grid frequency in the external electrical grid. The operator of an electrical power network can then identify the grid subsystem, e.g. generator or group of generators, contributing to oscillations in grid frequency and re-dispatch generation in the network such that the power is reduced on the relevant connection.

The skilled person will be able to identify other embodiments of the invention without departing from the scope of the appended claims.

The invention claimed is:

1. A method of determining contribution of a grid subsystem to oscillations in grid frequency in an external electrical grid in an electrical power network, the method comprising:
measuring, via at least one phasor measurement unit, oscillations in grid frequency in the external electrical grid;
measuring oscillations in power conveyed on at least one electrical connection between the grid subsystem and the external electrical grid; and
determining the contribution of the grid subsystem to the oscillations in the grid frequency in the external electrical grid by determining at least one phase relationship between the oscillations in grid frequency and the oscillations in power conveyed to determine a component of the oscillations in power that contributes to the oscillations in grid frequency in the external electrical grid.

2. The method according to claim 1 wherein determining the component of the oscillations in power that contribute to the oscillations in grid frequency in the external electrical grid comprises determining a magnitude of the component of the oscillations in power that is in quadrature with the oscillations in grid frequency.

3. The method according to claim 1 wherein the oscillations in grid frequency comprises oscillations in grid frequency in the grid subsystem.

4. The method according to claim 3 further comprising receiving a third quantity comprising oscillations in grid frequency within the external electrical grid.

5. The method according to claim 4 further comprising measuring the oscillations in grid frequency within the grid subsystem, measuring the oscillations in power conveyed on the at least one electrical connection to the grid subsystem and measuring the third quantity within the external electrical grid.

6. The method according to claim 5, further comprising determining whether oscillations in grid frequency in the grid subsystem are in common mode to oscillations in grid frequency in the external electrical grid in dependence on the frequency of the oscillations in grid frequency being less than 0.1 Hz.

7. The method according to claim 6 further comprising determining a magnitude of the component of the oscillations in power leading the phase of the oscillations in grid frequency by substantially 90 degrees.

8. The method according to claim 4, further comprising determining whether oscillations in grid frequency in the grid subsystem are in common mode to oscillations in grid frequency in the external electrical grid in dependence on the oscillations in grid frequency being substantially the same amplitude and phase as the third quantity.

9. The method according to claim 4, further comprising determining whether oscillations in grid frequency in the grid subsystem are in opposing phase to oscillations in grid frequency in the external electrical grid in dependence on the oscillations in grid frequency being substantially 180 degrees out of phase to the third quantity.

10. The method according to claim 3, further comprising determining whether oscillations in grid frequency in the grid subsystem are in opposing phase to oscillations in grid frequency in the external electrical grid in dependence on the frequency of the oscillations in grid frequency being greater than 0.2 Hz.

11. The method according to claim 10 further comprising determining a magnitude of the component of the oscillations in power lagging the phase of the oscillations in grid frequency by 90 degrees.

12. The method according to claim 1, wherein the at least one electrical connection comprises a plurality of electrical connections between the grid subsystem and the external electrical grid, and wherein the oscillations in power conveyed corresponds to a summation of the oscillations in power conveyed on each of the plurality of electrical connections.

13. The method according to claim 1 wherein:
the at least one electrical connection comprises a plurality of electrical connections between the grid subsystem and the external electrical grid;
measuring oscillations in power conveyed comprises receiving a plurality of quantities, each quantity corresponding to oscillations in power conveyed on one of the plurality of electrical connections; and
determining at least one phase relationship comprises determining a plurality of phase relationships between the oscillations in grid frequency and the plurality of quantities to determine the components of the oscillations in power that contribute to oscillations in the grid frequency in the external electrical grid.

14. The method according to claim 13 further comprising determining magnitudes of the components of the oscillations in power that are in quadrature with the oscillations in grid frequency.

15. A method of determining the contribution of a grid subsystem of a plurality of grid subsystems to oscillations in grid frequency in an external electrical grid in an electrical power network, the method comprising:
determining the contribution of a first grid subsystem of the plurality of grid subsystems according to claim 1;
determining the contribution of a second grid subsystem according to claim 1, wherein a magnitude of the contribution of the first grid subsystem is greater than a magnitude of the contribution of the second grid subsystem; and
normalising to a maximum value between −1 and 1, the magnitude of the second grid subsystem to the magnitude of the first grid subsystem.

16. The method according to claim 15 further comprising determining that the second grid subsystem is contributing to the oscillations in grid frequency in the external electrical grid if the normalised magnitude of the second grid subsystem is 0.5 or more.

17. A computer program product comprising computer program code executable on a computer processor to carry out the method according to claim 1.

18. An apparatus for determining contribution of a grid subsystem to oscillations in grid frequency in an external electrical grid in an electrical power network, the apparatus comprising:
a processor configured to:
measure, via at least one phasor measurement unit, oscillations in grid frequency in the external electrical grid;
receive a measurement of oscillations in power conveyed on at least one electrical connection between the grid subsystem and the external electrical grid; and
determine the contribution of the grid subsystem to the oscillations in the grid frequency in the external electrical grid by determining at least one phase relationship between the oscillations in grid frequency and the oscillations in power conveyed to determine a component of the oscillations in power that contributes to the oscillations in grid frequency in the external electrical grid.

19. The apparatus according to claim 18 further comprising a first measurement unit in communications link with the processor and to the at least one electrical connection to the grid subsystem, the first measurement unit arranged to measure the oscillations in power conveyed and provide them to the processor.

20. An electrical grid comprising the apparatus according to claim 18.

* * * * *